US012673635B2

(12) United States Patent
Matsushita et al.

(10) Patent No.: US 12,673,635 B2
(45) Date of Patent: Jul. 7, 2026

(54) OCCUPANT PROTECTION DEVICE

(71) Applicant: TOYODA GOSEI CO., LTD., Kiyosu (JP)

(72) Inventors: Homare Matsushita, Kiyosu (JP); Yoshito Kusuhara, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 19/299,483

(22) Filed: Aug. 14, 2025

(65) Prior Publication Data

US 2026/0054685 A1 Feb. 26, 2026

(30) Foreign Application Priority Data

Aug. 23, 2024 (JP) ................................. 2024-143397

(51) Int. Cl.
B60R 22/02 (2006.01)
B60N 2/62 (2006.01)
B60R 22/195 (2006.01)

(52) U.S. Cl.
CPC .......... B60R 22/02 (2013.01); B60R 22/1951 (2013.01); *B60N 2/62* (2013.01)

(58) Field of Classification Search
CPC ........ B60R 22/02; B60R 22/1951; B60N 2/62
See application file for complete search history.

(56) References Cited

U.S. PATENT DOCUMENTS 3,591,232 A * 7/1971 Simon ..................... B60R 21/02
296/68.1
6,682,141 B2 * 1/2004 Reynolds ........... B64D 11/0621
297/480

6,715,788 B2 * 4/2004 Saiguchi .............. B60N 2/4279
280/733
10,065,596 B2 * 9/2018 Fisher ..................... B60R 22/26
10,974,626 B2 * 4/2021 Yilma ............... B60N 2/42718
11,077,817 B1 * 8/2021 Jaradi ................... B60R 21/207
11,820,267 B2 * 11/2023 Kadam ................... B60N 2/62
(Continued)

FOREIGN PATENT DOCUMENTS

CN 114828699 A * 7/2022 ........... A47D 13/025
JP 2001-287622 A 10/2001

OTHER PUBLICATIONS

CN-114828699-A (machine translation) (Year: 2022).*

*Primary Examiner* — Jason D Shanske
*Assistant Examiner* — Joselynn Y Sliteris
(74) *Attorney, Agent, or Firm* — Posz Law Group, PLC

(57) ABSTRACT

An occupant protection device includes: a placement surface portion disposed on a seat portion and allowing an occupant to be placed thereon to support a region on a lower surface side at least around front ends of thighs of the occupant; two shoulder restraint belts extending from vicinities of left and right edges at an upper end of a backrest portion, disposed to pass in front of left and right shoulders of the occupant, and having distal ends coupled to vicinities of left and right edges at a front end of the placement surface portion; a placement surface portion-side belt being able to be unreeled by an unreeling mechanism and having a distal end coupled to a vicinity of a rear end of the placement surface portion; and a retractor disposed behind the seat and being able to reel each shoulder restraint belt upon detection of an impact force.

4 Claims, 6 Drawing Sheets

(56) References Cited

U.S. PATENT DOCUMENTS

| 11,904,795 | B2 * | 2/2024 | Line | B60R 22/1955 |
| 12,005,848 | B2 * | 6/2024 | Takahashi | B60R 21/02 |
| 12,337,784 | B2 * | 6/2025 | Shimizu | B60R 21/2338 |
| 12,391,204 | B2 * | 8/2025 | Takahashi | B60R 21/02 |
| 2023/0415690 | A1 * | 12/2023 | Takahashi | B60R 21/02 |
| 2023/0415695 | A1 * | 12/2023 | Kerkeling | B60R 21/01552 |

* cited by examiner

OCCUPANT PROTECTION DEVICE

CROSS REFERENCE TO RELATED APPLICATION

The present application claims priority from Japanese Patent Application No. 2024-143397 of Matsushita et al., filed on Aug. 23, 2024, the entire disclosures of which are incorporated herein by reference.

BACKGROUND

1. Technical Field

The present disclosure relates to an occupant protection device that is mounted on a seat of a vehicle to enable protection of an occupant seated on the seat.

2. Description of Related Art

As a conventional occupant protection device for protecting an occupant seated on a seat, JP 2001-287622 A discloses a three-point restraint seat belt including a shoulder belt that restrains the upper body of the occupant and a lap belt that restrains the lower body of the occupant. In the conventional seat belt, the shoulder belt and the lap belt are retracted by different retractors upon detection of a collision of a vehicle.

In the conventional occupant protection device, individually retracting the shoulder belt and the lap belt by different retractors enables stable and quick restraint of the occupant upon detection of a collision of the vehicle. However, in the conventional occupant protection device, there is a case where the front surface of a region around the waist or the abdomen is strongly pressed by the lap belt during retraction. There is room for improvement in such a point.

SUMMARY

An occupant protection device of the present disclosure has the following configuration:

an occupant protection device that is mounted on a seat of a vehicle to enable protection of an occupant seated on the seat, wherein the occupant protection device including:

a placement surface portion disposed on a seat portion of the seat, and configured to allow the occupant to be placed on the placement surface portion to be able to support a region on a lower surface side at least around front ends of thighs of the seated occupant;

two shoulder restraint belts extending from vicinities of left and right edges at an upper end of a backrest portion of the seat, disposed to pass in front of left and right shoulders of the occupant, and having distal ends coupled to vicinities of left and right edges at a front end of the placement surface portion;

a placement surface portion-side belt configured to be able to be unreeled by an unreeling mechanism disposed behind the seat and having a distal end coupled to a vicinity of a rear end of the placement surface portion; and a retractor disposed at a position behind the seat to enable unreeling of each of the shoulder restraint belts, and configured to be able to reel each of the shoulder restraint belts upon detection of an impact force applied from a front of the occupant.

DESCRIPTION OF THE PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
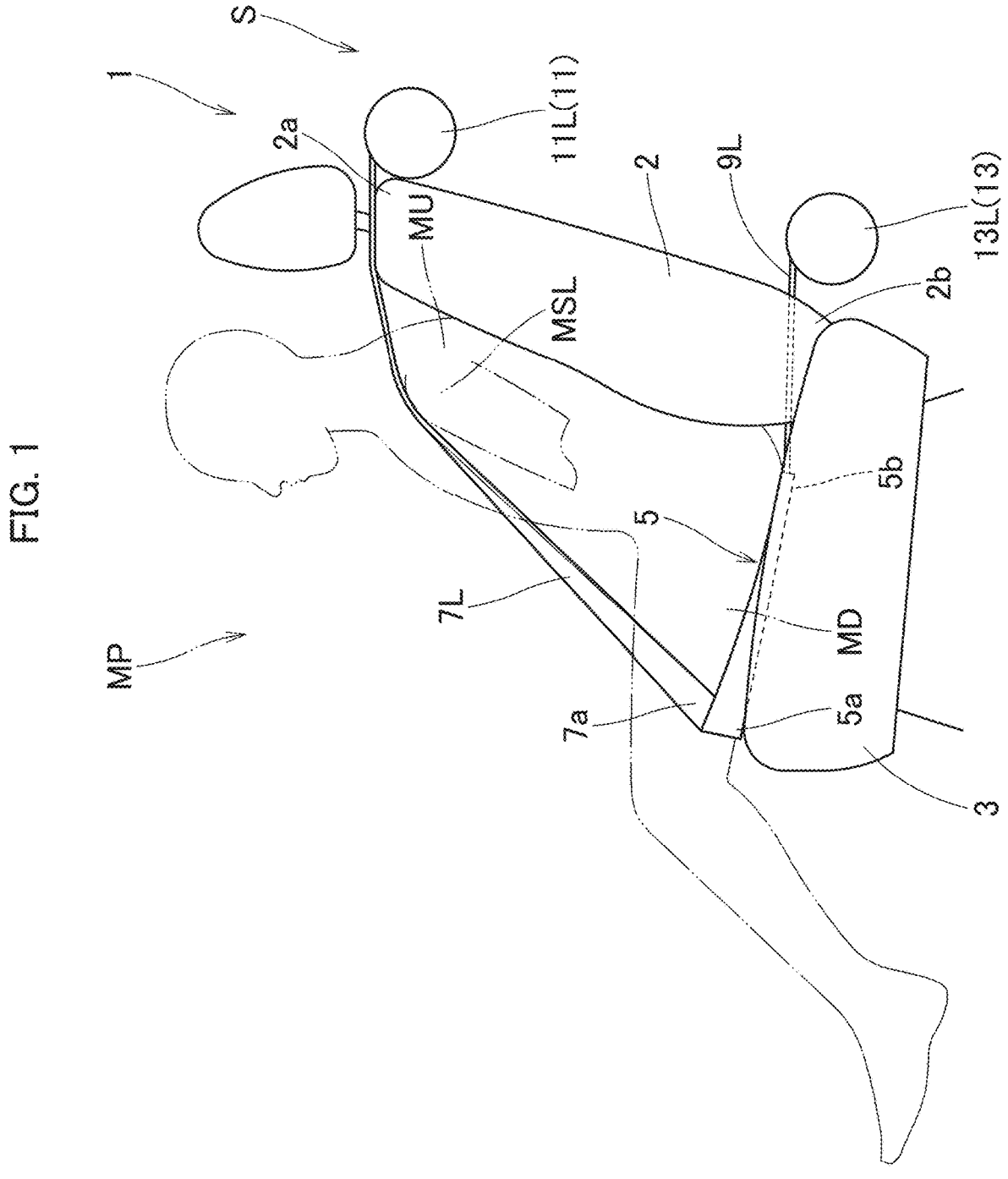
FIG. 1 is a schematic side view of a seat equipped with an occupant protection device according to an embodiment of the present disclosure.
Figure 2:
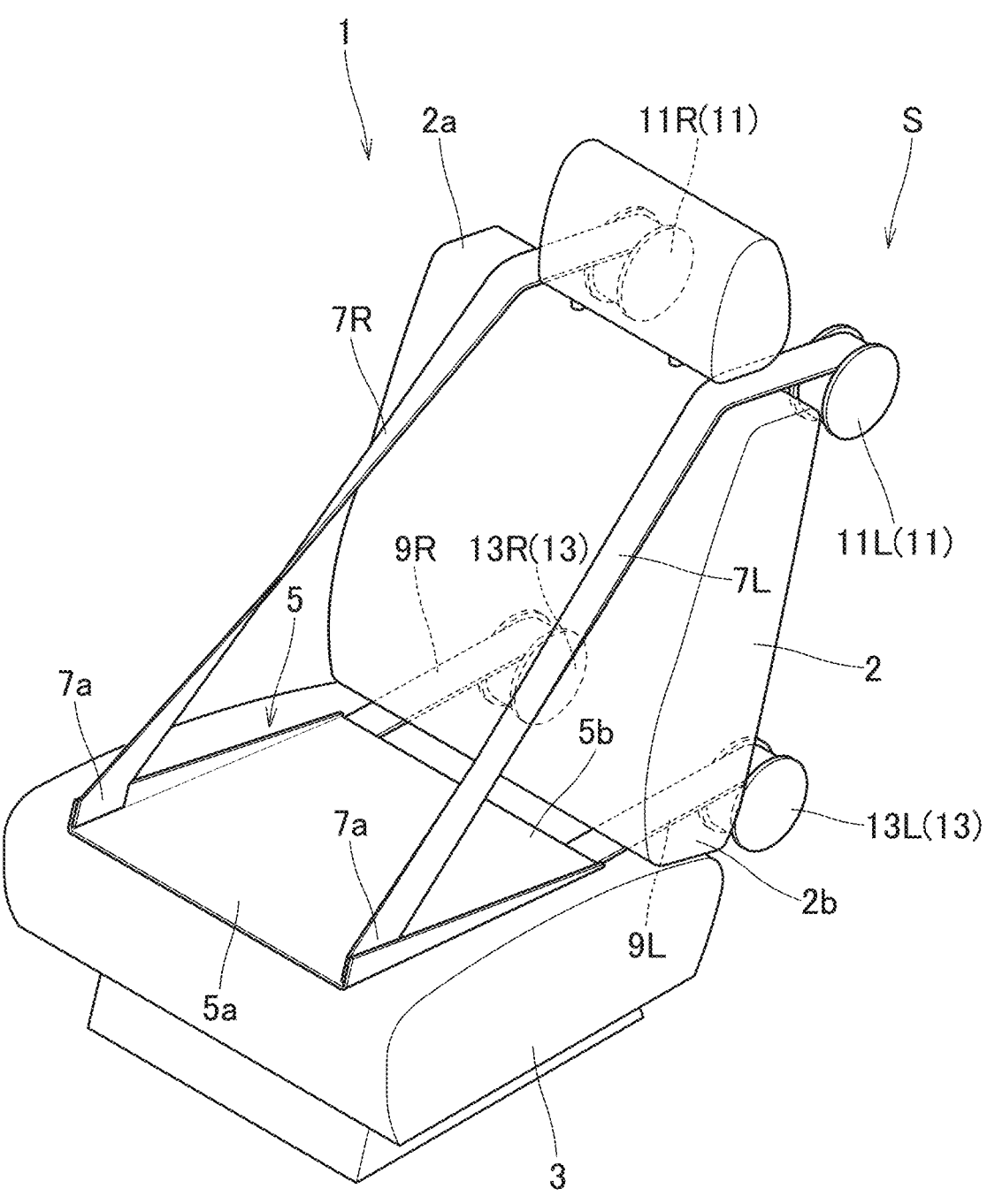
FIG. 2 is a schematic perspective view of the seat of FIG. 1.
Figure 3:
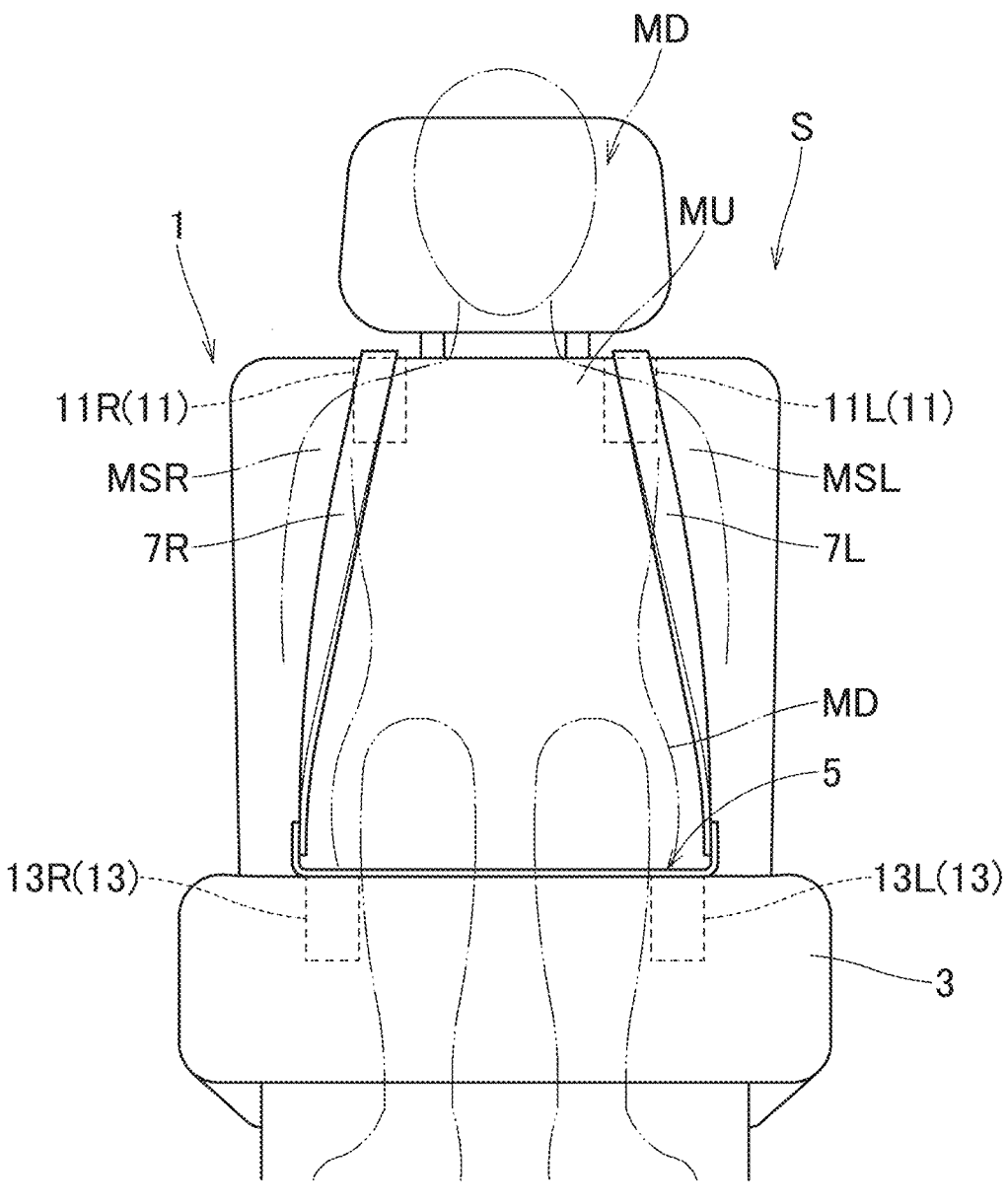
FIG. 3 is a schematic front view of the seat of FIG. 1.

Hereinafter, an embodiment of the present disclosure will be described with reference to the drawings. As illustrated in FIGS. 1 to 3, an occupant protection device S of the embodiment is mounted on a seat 1 of a vehicle. The seat 1 includes a backrest portion 2 and a seat portion 3. The embodiment will be described with the front-rear, up-down, and left-right directions coinciding with the front-rear, up-down, and left-right directions with respect to an occupant MP seated on the seat 1 unless otherwise specified. In the embodiment, a case where the occupant MP is seated on the seat 1 that is disposed in the forward direction in the vehicle (not illustrated) will be described as an example.

In the embodiment, as illustrated in FIGS. 1 to 3, the occupant protection device S includes: a placement surface portion 5 disposed on the seat portion 3 of the seat 1; two (a pair of left and right) shoulder restraint belts 7L and 7R; two (a pair of left and right) placement surface portion-side belts 9L and 9R; retractors 11 (11L and 11R) configured to be able to respectively reel the shoulder restraint belts 7L and 7R; and unreeling mechanisms 13 (13L and 13R) configured to be able to respectively unreel the placement surface portion-side belts 9L and 9R. In the embodiment, the left and right retractors 11 (11L and 11R) are paired corresponding to the shoulder restraint belts 7L and 7R (see FIGS. 2 and 3). The left and right unreeling mechanisms 13 (13L and 13R) are also paired corresponding to the placement surface portion-side belts 9L and 9R (see FIGS. 2 and 3).

The placement surface portion 5 is configured to allow the occupant MP, who is going to be seated on the seat 1, to be placed thereon. In the embodiment, the placement surface portion 5 is disposed on the upper surface side of the seat portion 3 as a separate portion from the seat portion 3. Specifically, in the embodiment, the placement surface portion 5 is formed of a flexible sheet, and has a substantially quadrangular outer shape. The placement surface portion 5 covers substantially the entire upper surface of the seat portion 3 in a flatted state (see FIG. 2). That is, the placement surface portion 5 is disposed between a lower body MD of the occupant MP seated on the seat 1 and the seat portion 3, and is configured to cover substantially the entire lower surface side of the lower body MD (specifically, from the buttocks to the thighs) of the occupant MP. In other words, the placement surface portion 5 is configured to be able to support a region on the lower surface side of the lower body MD (from the buttocks to the thighs). In the embodiment, a woven fabric composed of a polyester yarn, a polyamide yarn, or the like is used as the sheet constituting the placement surface portion 5.

The two (pair of left and right) shoulder restraint belts 7L and 7R extend from the vicinities of left and right edges at an upper end 2a of the backrest portion 2, respectively. The shoulder restraint belts 7L and 7R are disposed so as to pass in front of left and right shoulders MSL and MSR of the occupant MP seated on the seat 1 (so as to be able to restrain the left and right shoulders MSL and MSR). A distal end 7a of each of the shoulder restraint belts 7L and 7R is coupled (sewn) to the vicinity of a left edge or a right edge at a front end 5a of the placement surface portion 5 (see FIGS. 1 to 3). In the embodiment, each of the shoulder restraint belts 7L and 7R is configured to extend from the upper end 2a side of the backrest portion 2 with one end side (starting side) wound around a reeling shaft (not illustrated) that is disposed inside the retractor 11L or 11R disposed behind the upper end 2a of the backrest portion 2 at a position behind the seat 1 through the upper surface side of the upper end 2a of the backrest portion 2. The shoulder restraint belts 7L and 7R are formed of a flexible long body, and specifically, the same belt material as that used for a seat belt is used.

The two (pair of left and right) placement surface portion-side belts 9L and 9R are disposed so as to extend from left and right edge sides in the vicinity of a rear end 5b of the placement surface portion 5. One end side of each of the placement surface portion-side belts 9L and 9R is coupled (sewn) to the left edge side or the right edge side in the vicinity of the rear end 5b of the placement surface portion 5. In the embodiment, the placement surface portion-side belts 9L and 9R are disposed so as to extend rearward while being inserted through predetermined locations in the vicinity of a lower end 2b of the backrest portion 2 (see FIGS. 1 and 2). The other end side of each of the placement surface portion-side belts 9L and 9R is wound around a winding shaft (not illustrated) that is disposed inside the unreeling mechanism 13L or 13R disposed behind the seat portion 3 at a position behind the seat 1. That is, the placement surface portion-side belts 9L and 9R can be unreeled by the unreeling mechanisms 13L and 13R disposed behind the seat 1, and each of their distal ends is coupled to the left edge side or the right edge side in the vicinity of the rear end 5b of the placement surface portion 5. Similarly to the shoulder restraint belts 7L and 7R, the placement surface portion-side belts 9L and 9R are made of the same belt material as that used for a seat belt.

The left and right retractors 11L and 11R are paired as described above. Each of the retractors 11L and 11R winds one end side of the corresponding shoulder restraint belt 7L or 7R around the reeling shaft (not illustrated) disposed therein so as to be able to unreel the shoulder restraint belt 7L or 7R by a predetermined amount and reel the shoulder restraint belt 7L or 7R during operation. The retractors 11L and 11R include a predetermined drive mechanism (not illustrated). The drive mechanism is electrically connected to an operation control device (not illustrated) disposed in the vehicle. In the embodiment, the drive mechanism causes the retractors 11L and 11R to operate so as to reel the shoulder restraint belts 7L and 7R by a predetermined reeling force (reeling load) upon detection of a frontal collision of the vehicle.

The left and right unreeling mechanisms 13L and 13R are also paired as described above. Each of the unreeling mechanisms 13L and 13R winds one end side of the corresponding placement surface portion-side belt 9L or 9R around the winding shaft (not illustrated) disposed therein so as to be able to unreel the placement surface portion-side belt 9L or 9R by a predetermined amount. The unreeling mechanisms 13L and 13R are configured to respectively unreel the placement surface portion-side belts 9L and 9R during forward movement of the placement surface portion 5 accompanying forward movement of the lower body MD of the occupant MP in the event of a frontal collision of the vehicle. Although not illustrated in detail, the retractors 11L and 11R and the unreeling mechanisms 13L and 13R are fixed to the seat 1 using a predetermined bracket or the like.

In the occupant protection device S of the embodiment, the occupant MP is seated on the seat 1 so as to be placed on the placement surface portion 5 disposed on the seat portion 3 of the seat 1. When the occupant MP is seated on the seat 1, the two shoulder restraint belts 7L and 7R extending from the vicinities of the left and right edges at the front end 5a of the placement surface portion 5 to the vicinities of the left and right edges at the upper end 2a of the backrest portion 2 are disposed so as to pass in front of the left and right shoulders MSL and MSR (so as to be able to restrain the left and right shoulders MSL and MSR) (see FIG. 4). The shoulder restraint belts 7L and 7R can be unreeled from the retractors 11L and 11R disposed behind the seat 1. The shoulder restraint belts 7L and 7R are configured to be able to be reeled by the retractors 11L and 11R under application of an impact force from the front of the occupant MP. That is, when the impact force is applied from the front of the occupant MP, the shoulder restraint belts 7L and 7R are respectively drawn out to some extent from the retractors 11L and 11R while being pushed by the occupant MP (specifically, an upper body MU of the occupant MP) moving forward upon receiving an inertia force against the reeling force (reeling load) obtained by reeling by the retractors 11L and 11R. Thereafter, the shoulder restraint belts 7L and 7R are reeled by the retractors 11L and 11R to restrict further forward movement of the upper body MU of the occupant MP while restraining the left and right shoulders MSL and MSR of the occupant MP. When the impact force is applied, the lower body MD of the occupant MP also receives the inertia force to move forward. At this time, the placement surface portion 5 supporting the region on the lower surface side at least around the front ends of the thighs also moves forward with the placement surface portion-side belts 9L and 9R unreeled from the unreeling mechanisms 13L and 13R along with the forward movement of the lower body MD. The distal ends of the respective shoulder restraint belts 7L and 7R are coupled to the vicinities of the left and right edges at the front end 5a of the placement surface portion 5. Therefore, the placement surface portion 5 is raised upward on the front end 5a side by a tensile force (reeling force) acting on the shoulder restraint belts 7L and 7R while moving forward. The lower body MD of the occupant MP is also raised upward on the front side (around the front ends of the thighs) by the placement surface portion 5 during the forward movement, so that large forward movement of the lower body MD is restricted. At this time, since the left and right shoulders MSL and MSR of the upper body MU of the occupant MP are restrained by the shoulder restraint belts 7L and 7R to which the tensile force is applied by the operations of the retractors 11L and 11R, it is also possible to appropriately restrict large movement of the upper body MU toward the lower body MD. As a result, the occupant protection device S of the embodiment can quickly restrain the left and right shoulders MSL and MSR, and can also appropriately reduce contact between the upper body MU and the lower body MD to appropriately restrain the occupant MP without adopting a configuration of directly restraining the waist by pressing the front surface around the waist or the abdomen.

Figure 4:
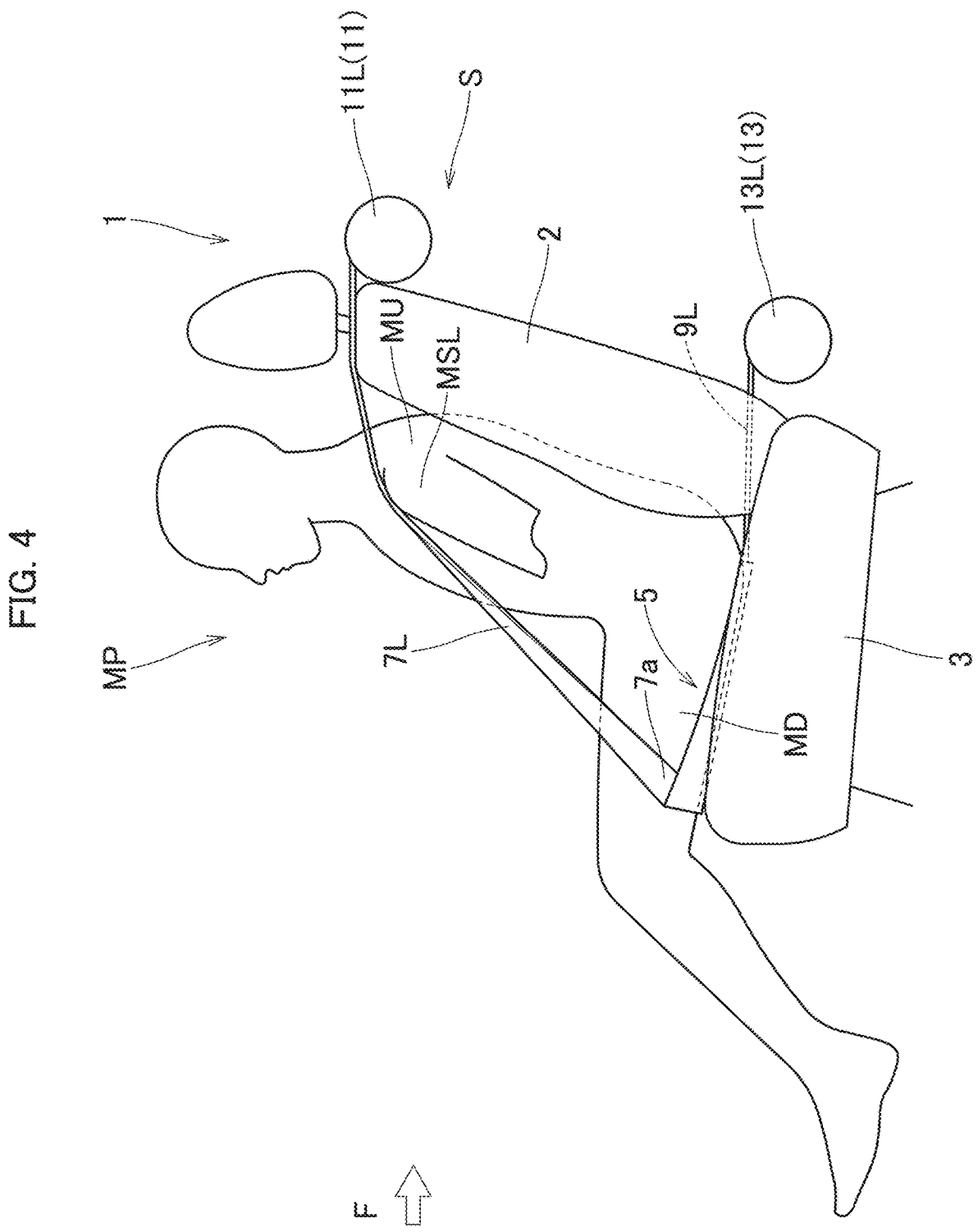
FIG. 4 is a side view of the seat illustrating a state in which an occupant is seated on the seat in the occupant protection device of the embodiment.
Figure 5:
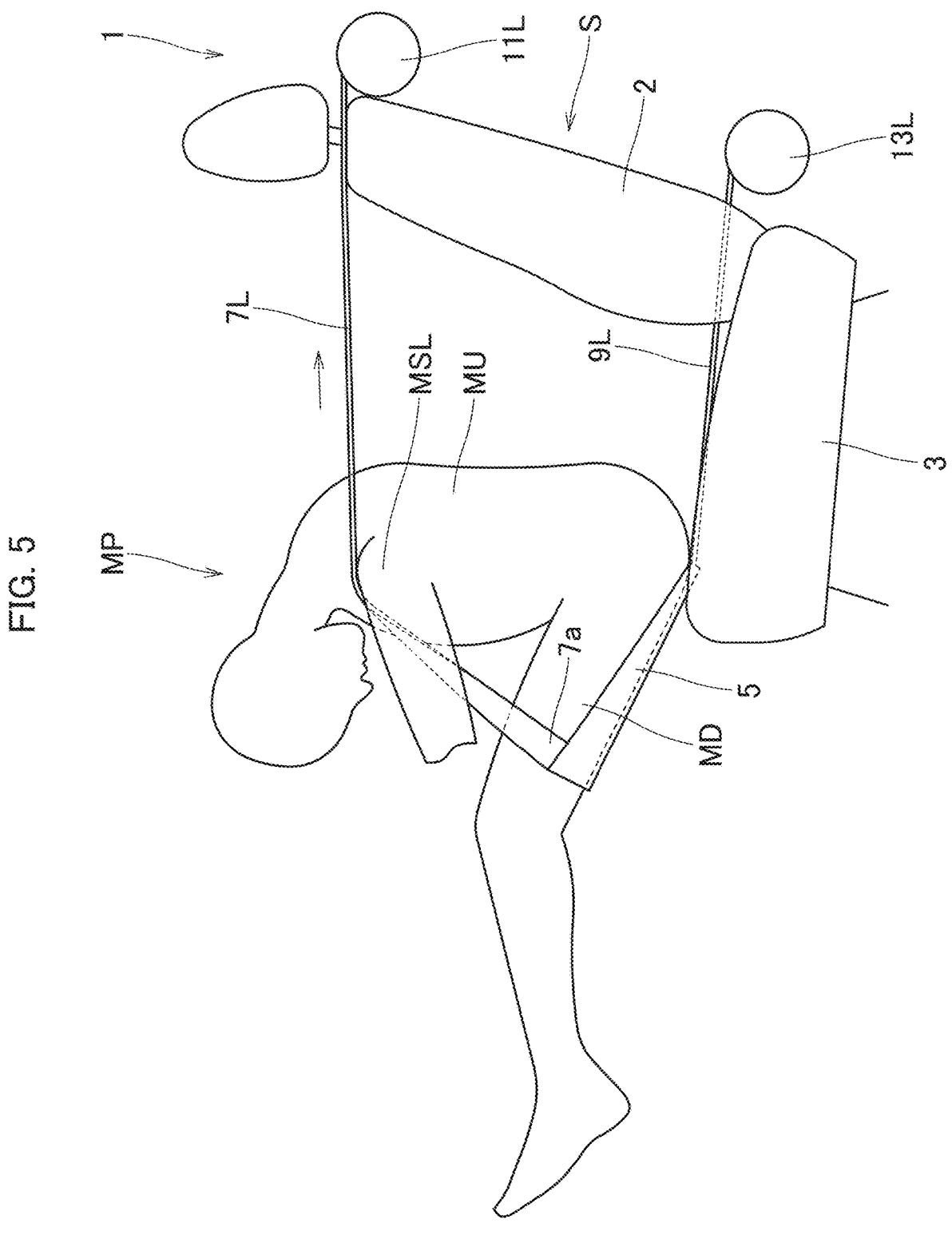
FIG. 5 is a side view of the seat illustrating a moving state of the occupant under application of an impact force from the front of a vehicle in the occupant protection device of the embodiment.
Figure 6:
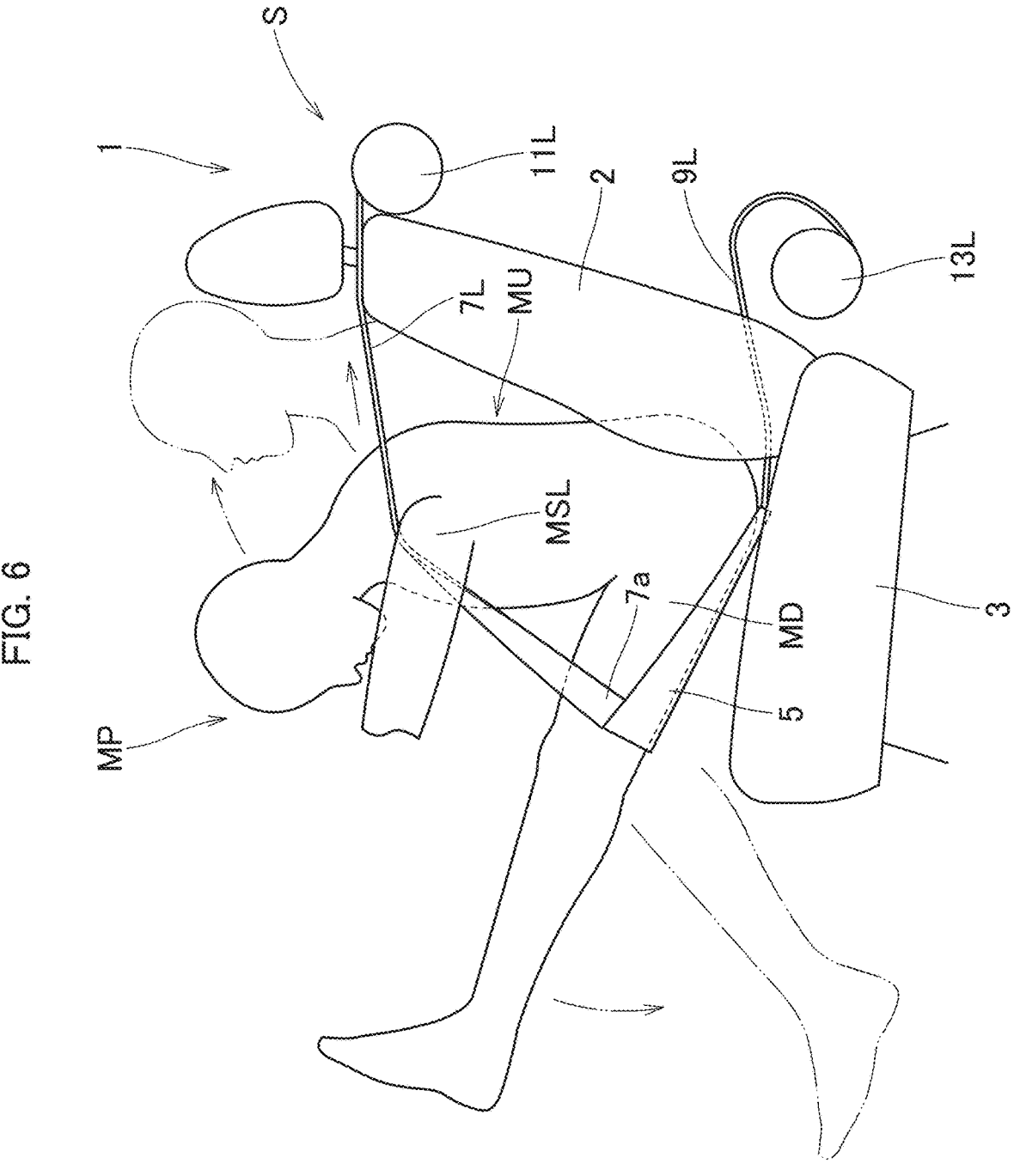
FIG. 6 is a side view of the seat illustrating a state of the occupant, which is a state after FIG. 5, in the occupant protection device of the embodiment.

Specifically, in the occupant protection device S of the embodiment, as illustrated in FIG. 4, the retractors 11L and 11R start to operate under application of an impact force F from the front side in the event of a frontal collision of the vehicle when the occupant MP is seated on the seat 1 with the shoulder restraint belts 7L and 7R disposed so as to respectively press the front surfaces of the left and right shoulders MSL and MSR. As illustrated in FIG. 5, the occupant MP moves largely forward while drawing out the shoulder restraint belts 7L and 7R along with the inertia force against the reeling force (reeling load) acting on the shoulder restraint belts 7L and 7R by the operations of the retractors 11L and 11R. At this time, the placement surface portion 5 also moves forward together with the lower body MD by unreeling the placement surface portion-side belts 9L and 9R. When the forward movement of the occupant MP stops, the shoulder restraint belts 7L and 7R pull back the occupant MP toward the seat 1 while restraining the left and right shoulders MSL and MSR of the occupant MP by the reeling force (reeling load) acting on the shoulder restraint belts 7L and 7R as illustrated in FIG. 6. At this time, the placement surface portion 5 supporting the lower surface side of the lower body MD is also pulled back toward the seat 1 together with the lower body MD. The placement surface portion-side belts 9L and 9R in the state of being unreeled from the unreeling mechanisms 13L and 13R are left loosened (see FIG. 6). As a result, the occupant MP can be stably restrained by the two shoulder restraint belts 7L and 7R.

Therefore, the occupant protection device S of the embodiment can appropriately restrain the occupant MP without pressing the front surface around the waist or the abdomen of the occupant MP.

In the occupant protection device S of the embodiment, the two placement surface portion-side belts 9L and 9R are disposed so as to extend from the left and right edge sides in the vicinity of the rear end 5b of the placement surface portion 5. Therefore, during unreeling of the placement surface portion-side belts 9L and 9R, the placement surface portion 5 can be prevented from moving unequally between the left and right sides.

Furthermore, in the occupant protection device S of the embodiment, the placement surface portion 5 is disposed on the upper surface side of the seat portion 3 as a separate portion from the seat portion 3, and is configured to be able to cover substantially the entire lower surface side from the buttocks to the thighs of the occupant MP. That is, the configuration of the occupant protection device S of the embodiment can be simplified by providing the placement surface portion 5 as a separate portion from the seat portion 3. Although the placement surface portion 5 is provided as a separate portion from the seat portion 3, the placement surface portion 5 covers substantially the entire upper surface of the seat portion 3. That is, the placement surface portion 5 covers substantially the entire lower surface side from the buttocks to the thighs of the occupant MP. The two placement surface portion-side belts 9L and 9R are disposed so as to extend from the left and right edge sides in the vicinity of the rear end 5b of the placement surface portion 5. Therefore, although the placement surface portion 5 is provided as a separate portion from the seat portion 3, the placement surface portion 5 can stably support substantially the entire lower surface side of the lower body MD of the occupant MP.

Without considering such a point, the placement surface portion may be constituted by a part of the region on the upper surface side of the seat portion, and the region forming the placement surface portion may be slidingly movable with respect to the seat portion although the configuration becomes complicated. In a case where the placement surface portion is configured to separate from a part of the seat portion as described above, the placement surface portion-side belt may be disposed only at one location around the center between the left and right sides. In the embodiment, the placement surface portion 5 is formed of the flexible sheet. However, for example, a cushion or the like may be used as the placement surface portion. In the embodiment, the woven fabric composed of a polyester yarn, a polyamide yarn, or the like is used as the placement surface portion 5. Of course, the material forming the placement surface portion is not limited to the embodiment. It is preferable that the placement surface portion is formed of a material that is difficult for the occupant to slip. Furthermore, in the embodiment, the placement surface portion 5 is configured to cover substantially the entire upper surface of the seat portion 3. However, as long as the region on the lower surface side of the lower body of the occupant can be stably supported during operation, the placement surface portion may cover the region on the lower surface side at least around the front ends of the thighs of the occupant without covering the entire upper surface of the seat portion. Furthermore, in the embodiment, the placement surface portion-side belts 9L and 9R extending from the vicinity of the rear end 5b of the placement surface portion 5 are configured to be unreeled by the unreeling mechanisms 13L and 13R. However, similarly to the shoulder restraint belts, the placement surface portion-side belt may be configured to be unreeled from a retractor and reeled by the retractor under application of an impact force from the front side.

The present disclosure relates to an occupant protection device having the following configuration:

an occupant protection device that is mounted on a seat of a vehicle to enable protection of an occupant seated on the seat, wherein the occupant protection device including:

a placement surface portion disposed on a seat portion of the seat, and configured to allow the occupant to be placed on the placement surface portion to be able to support a region on a lower surface side at least around front ends of thighs of the seated occupant;

two shoulder restraint belts extending from vicinities of left and right edges at an upper end of a backrest portion of the seat, disposed to pass in front of left and right shoulders of the occupant, and having distal ends coupled to vicinities of left and right edges at a front end of the placement surface portion;

a placement surface portion-side belt configured to be able to be unreeled by an unreeling mechanism disposed behind the seat and having a distal end coupled to a vicinity of a rear end of the placement surface portion; and a retractor disposed at a position behind the seat to enable unreeling of each of the shoulder restraint belts, and configured to be able to reel each of the shoulder restraint belts upon detection of an impact force applied from a front of the occupant.

In the occupant protection device of the present disclosure, the occupant is seated on the seat so as to be placed on the placement surface portion disposed on the seat portion of the seat. When the occupant is seated on the seat, the two shoulder restraint belts extending from the vicinities of the left and right edges at the front end of the placement surface portion to the vicinities of the left and right edges at the upper end of the backrest portion are disposed so as to pass in front of the left and right shoulders. The shoulder restraint belts can be unreeled from the retractors disposed behind the seat. The shoulder restraint belts are configured to be able to be reeled by the retractors under application of an impact force from the front of the occupant. That is, when the impact force is applied from the front of the occupant, the shoulder restraint belts are respectively drawn out to some extent from the retractors while being pushed by the occupant (specifically, the upper body of the occupant) moving forward upon receiving an inertia force against a reeling force (reeling load) obtained by reeling by the retractors. Thereafter, the shoulder restraint belts are reeled by the retractors to restrict further forward movement of the upper body of the occupant while restraining the left and right shoulders of the occupant. When the impact force is applied, the lower body of the occupant also receives the inertia force to move forward. At this time, the placement surface portion supporting the region on the lower surface side at least around the front ends of the thighs also moves forward with the placement surface portion-side belt unreeled from the unreeling mechanism along with the forward movement of the lower body. The distal ends of the respective shoulder restraint belts are coupled to the vicinities of the left and right edges at the front end of the placement surface portion. Therefore, the placement surface portion is raised upward on the front end side by a tensile force (reeling force) acting on the shoulder restraint belts while moving forward. The lower body of the occupant is also raised upward on the front side (around the front ends of the thighs) by the placement surface portion during the forward movement, so that large forward movement of the lower body is restricted. At this time, since the left and right shoulders of the upper body of the occupant are restrained by the shoulder restraint belts to which the tensile force is applied by the operations of the retractors as described above, it is also possible to appropriately restrict large movement of the upper body toward the lower body. As a result, the occupant protection device of the present disclosure can quickly restrain the left and right shoulders, and can also appropriately reduce contact between the upper body and the lower body to appropriately restrain the occupant without adopting a configuration of directly restraining the waist by pressing the front surface around the waist or the abdomen.

Therefore, the occupant protection device of the present disclosure can appropriately restrain the occupant without pressing the front surface around the waist or the abdomen of the occupant.

In the occupant protection device of the present disclosure, it is preferable that two of the placement surface portion-side belts are disposed so as to extend from left and right edge sides in the vicinity of the rear end of the placement surface portion. With the occupant protection device having such a configuration, during unreeling of the placement surface portion-side belts, the placement surface portion can be prevented from moving unequally between the left and right sides.

Furthermore, in the occupant protection device having the above configuration, it is preferable that the placement surface portion is disposed on the upper surface side of the seat portion as a separate portion from the seat portion, and is configured to be able to cover substantially the entire lower surface side from the buttocks to the thighs of the occupant. With the occupant protection device having such a configuration, the configuration can be simplified by providing the placement surface portion as a separate portion from the seat portion. Although the placement surface portion is provided as a separate portion from the seat portion, the placement surface portion is configured to be able to cover substantially the entire lower surface side from the buttocks to the thighs of the occupant, and the two placement surface portion-side belts are disposed so as to extend from the left and right edge sides in the vicinity of the rear end of the placement surface portion. Therefore, substantially the entire lower surface side of the lower body of the occupant can be stably supported.

What is claimed is:

1. An occupant protection device that is mounted on a seat of a vehicle to enable protection of an occupant seated on the seat, wherein the occupant protection device comprising:

a placement surface portion disposed on a seat portion of the seat and configured to allow the occupant to be placed on the placement surface portion to be able to support a region on a lower surface side at least around front ends of thighs of the seated occupant;

two shoulder restraint belts extending from vicinities of left and right edges at an upper end of a backrest portion of the seat, disposed and configured to pass in front of left and right shoulders of the occupant, and having distal ends coupled to vicinities of left and right edges at a front end of the placement surface portion;

at least one placement surface portion-side belt configured to be able to be unreeled by an unreeling mechanism disposed behind the seat and having a distal end coupled to a vicinity of a rear end of the placement surface portion; and a retractor disposed at a position behind the seat to enable unreeling of each of the shoulder restraint belts, and configured to be able to reel each of the shoulder restraint belts upon detection of an impact force applied from a front of the occupant.

2. The occupant protection device according to claim 1, wherein two of the placement surface portion-side belts are disposed to extend from left and right edge sides in the vicinity of the rear end of the placement surface portion.

3. The occupant protection device according to claim 2, wherein the placement surface portion is disposed on an upper surface side of the seat portion as a separate portion from the seat portion, and is configured to be able to cover substantially an entire lower surface side from buttocks to the thighs of the occupant.

4. The occupant protection device according to claim 3, wherein
the placement surface portion is formed of a sheet having flexibility.

* * * * *